July 20, 1965     B. BARÉNYI     3,195,945
DOOR FOR MOTOR VEHICLES
Filed Oct. 9, 1961     2 Sheets-Sheet 1
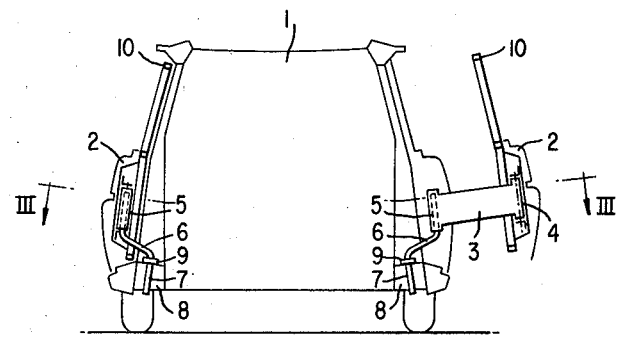
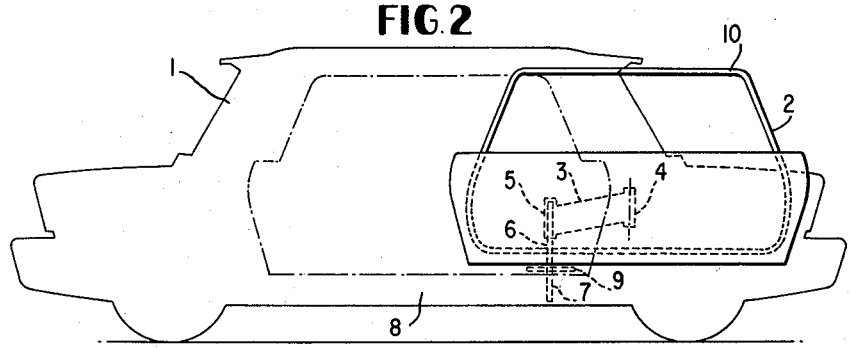
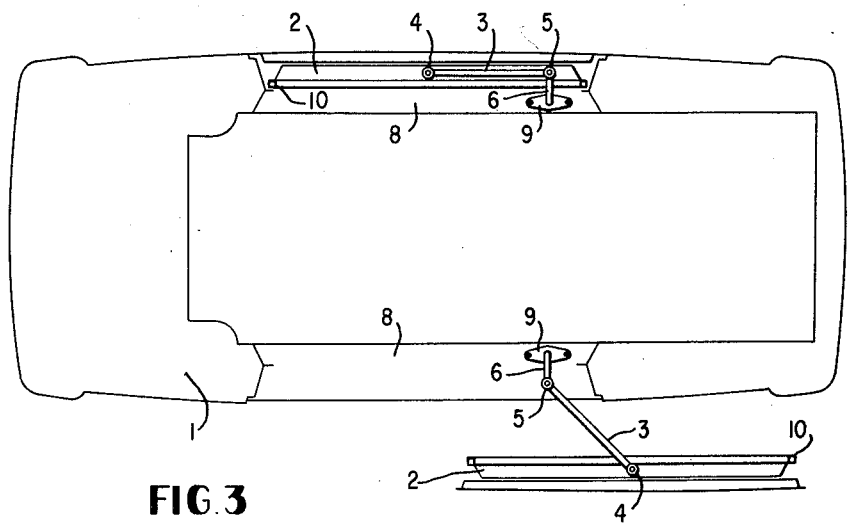
INVENTOR.
BELA BARENYI
BY *Dicke and Craig*
ATTORNEYS

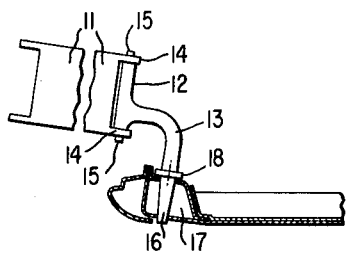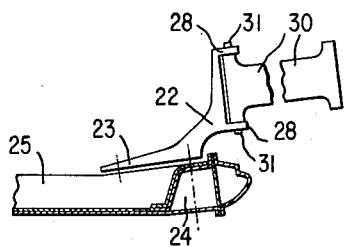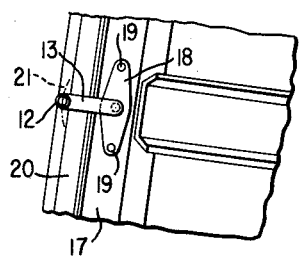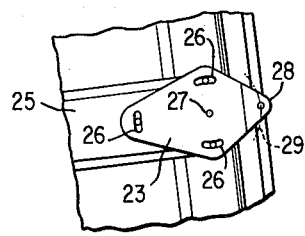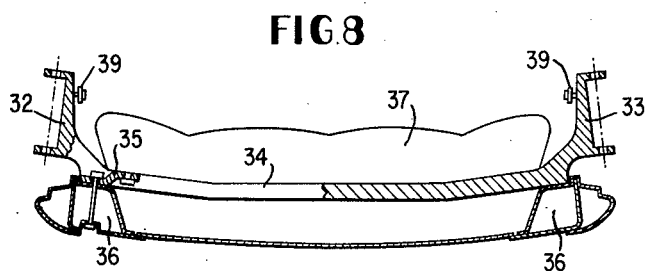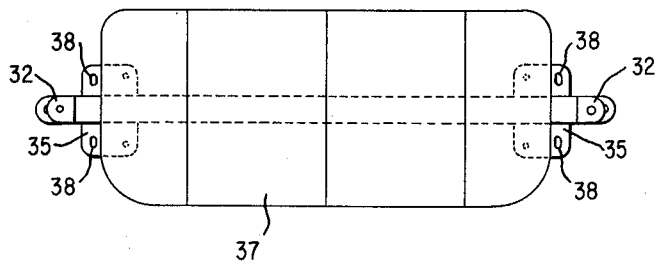
INVENTOR.
BELA BARENYI

United States Patent Office 3,195,945
Patented July 20, 1965

3,195,945
DOOR FOR MOTOR VEHICLES
Béla Barényi, Stuttgart-Vaihingen, Germany, assignor to Daimler-Benz Aktiengesellschaft, Stuttgart-Unterturkheim, Germany
Filed Oct. 9, 1961, Ser. No. 143,842
Claims priority, application Germany, Oct. 7, 1960, D 34,449
4 Claims. (Cl. 296—46)

The present invention relates to a swingable sliding door for motor vehicles which is carried by one or several support arms, and has as its primary aim to so construct such a swingable sliding door that the width of the vehicle interior space is not reduced by the dood suspension. Additionally, the present invention is intended to permit a fine adjustment of the bearing for the support arm or arms of the swingable sliding door on the side nearer the vehicle in order that the door may be accurately fitted, without difficulties or the exercise of special care, into the door frame during assembly of the vehicle.

The present invention essentially consists in disposing the vehicle-side bearing, i.e., the bearing nearer the interior space of the motor vehicle for each support arm, with a closed door, within the plane of the sealing frame of the door or, as viewed from the vehicle interior space, outside thereof. The vehicle-side bearing for the support arm and therewith the support arm itself is thereby displaced by such measures outwardly outside of the vehicle interior space so that the width of the vehicle interior space is not impaired. Since additionally, the mounting of the bearing has to take place at the supporting frame-like parts of the motor vehicle, a lever arm is created between the mounting place and the bearing itself which makes it possible to undertake a fine adjustment of the bearing place in the longitudinal direction of the motor vehicle.

According to a further development of the present invention, the bearing for the support arm located on the vehicle side may be constituted, for example, by an offset or cranked bearing pin or journal, inserted preferably into a lateral longitudinal bearer member of the motor vehicle. However, in lieu thereof, such a bearing may also be secured on the longitudinal and/or cross bearers of the motor vehicle by means of brackets.

It is particularly appropriate if, according to a further feature of the present invention, the bearing for the support arm disposed on the side near the motor vehicle is provided at the end of a continuous cross bearer which is secured at the longitudinal bearers of the motor vehicle. Such a cross bearer may serve simultaneously for the support and mounting of vehicle seats or of a seat bench and may form particularly together with the seats or the seat bench a readily detachable structural assembly.

Accordingly, it is an object of the present invention to provide a slidable door of the swinging type which effectively eliminates the disadvantages encountered with the prior art constructions and which, in particular, effectively prevents any reduction in the available width of the vehicle interior space by parts of the door suspension.

It is another object of the present invention to provide a swinging-type slidable door for motor vehicles which is so constructed and suspended that an accurate fitting thereof within the door frame is readily possible during assembly without requiring great skill or the exercise of special care on the part of person performing such work.

Still a further object of the present invention resides in the provision of a suspension arrangement for a slidable door adapted to swing in and out of the door frame which not only eliminates the danger of reducing the available width in the interior space of the vehicle but also permits, without great difficulty, a fine adjustment of the door suspension to accurately fit the door to the vehicle body.

A further object of the present invention resides in the provision of a suspension arrangement for swingable sliding doors which may be readily combined into a detachable structural subassembly with a cross bearer member, particularly together with the seat supports or seat benches of the motor vehicle.

These and other objects, features and advantages of the present invention will become more obvious from the following description when taken in connection with the accompanying drawing which shows, for purposes of illustration only, several embodiments in accordance with the present invention, and wherein—

FIGURE 1 is a schematic transverse cross sectional view through a passenger motor vehicle provided with a swingable sliding door in accordance with the present invention;

FIGURE 2 is a schematic side elevational view of the motor vehicle of FIGURE 1;

FIGURE 3 is a cross sectional view taken along line III—III of FIGURE 1;

FIGURE 4 is a somewhat schematic elevational view of a first embodiment of a support-arm bearing located on the side near the motor vehicle interior space;

FIGURE 5 is a top plan view of the bearing illustrated in FIGURE 4;

FIGURE 6 is a somewhat schematic elevational view of a second embodiment of a support arm bearing located on the side near the vehicle interior space;

FIGURE 7 is a top plan view of the bearing of FIGURE 6;

FIGURE 8 is a somewhat schematic elevational view of a subassembly including the support bearings and seat cushions of a seating bench, partially in cross section, and FIGURE 9 is a top plan view of the subassembly of FIGURE 8.

Referring now to the drawing wherein like reference numerals are used throughout the various views, and more particularly to FIGURES 1 to 3, reference numeral 1 designates therein a passenger motor vehicle of any suitable construction which is provided with a sliding door 2 of the swingable type. Each swingable sliding door 2 is supported by a support arm 3. The support arms 3 are rotatably supported on the doors 2 at bearing places 4. The vehicle-side bearing 5, i.e., the bearing 5 of the support arm 3 disposed nearer the vehicle interior space is disposed at the ends of the offset bearing pins 6 which are inserted with the extensions 7 thereof into the longitudinal bearers 8 of the motor vehicle 1 and are secured with the aid of flanges 9 to the upper side of the longitudinal bearers 8. As shown in particular in FIGURES 1 and 3, the bearing pins 6 are offset or cranked to such an extent that the vehicle-side bearings 5 for the support arms 3 are disposed, with closed doors 2, outside of the plane defined by the sealing frame 10 of the doors 2. As may be readily recognized from the drawing, the bearings 5 arranged in such a manner do not impair the available width of the vehicle interior space and the doors 2 may be readily displaced in the longitudinal direction thereof within certain limits by a simple rotation of the cranked pins 6 about the inserted extensions 7 thereof so that a fitting of the doors within the frames thereof offers no difficulties whatsoever. Additionally, it is of advantage that, with a construction in accordance with the present invention of the vehicle-side bearing 5 for the support arms 3, the bearing places 4 and 5 may each be arranged with a closed door in a plane which extends partllel to the plane of the sealing frame 10 of the door 2 so that the door during closing is guided practically exactly perpendicularly to the plane of the sealing frame within the door frame.

The construction of the vehicle-side bearing for the support arm 3 as offset bearing pin inserted into a lateral longitudinal bearer of the motor vehicle, indicated only schematically in FIGURES 1 to 3, is illustrated more fully in FIGURES 4 and 5. The bearing for the support arm 11 is constituted in this embodiment by a cylindrical extension 12 at the offset bearing pin or journal 13 the end faces of which are surrounded in a fork-like manner by the lugs 14 provided at the inwardly extending ends of the support arm 11. Bolts 15 are inserted into the end faces of the cylindrical extension 12, for example, are threadably inserted into the same which extend through appropriate bores provided in the lugs 14 of the support arm 11 so that the support arm 11 is rotatably connected with the cylindrical extension 12 of the bearing pin 13.

The offset pin or trunnion 13 is constructed conically at the opposite end thereof and extends with the conical portion 16 thereof through the sheet metal parts of the hollow bearer member 17 which extends in the longitudinal direction of the motor vehicle. The offset pin or journal 13 is provided with a flange 18 above the conical portion 16 thereof which flange 18 rests against the upper surface of the hollow bearer 17 and is provided with bores 19 for threadably securing the flange 18 to the hollow bearer 17. Slots which are preferably arcuate are provided in hollow bearer 17 in alignment with the smaller bores 19 in flange 18. During assembly, the conical portion 16 of the pin or journal 13 is inserted into the hollow bearer 17 and the door 20 is brought into the closed position thereof as indicated in FIGURE 5. This is possible without any difficulties as the offset bearing pin or journal 13 may rotate about its conical portion 16 whereby the cylindrical extension 12 containing the door-side bearing place moves along the arc 21 essentially in the longitudinal direction of the motor vehicle and automatically assumes the position which is necessary for an unobjectionable completely satisfactory fitting of the door. Subsequent thereto, the flange 18 is secured at the hollow bearer 17, for example, by means of bolts or screws which extend through the bores 19 provided in flange 18 into the slots in hollow bearer 17. Any special fitting operations during assembly of the door are therefore completely eliminated by the present invention.

The bearing 22 illustrated in FIGURES 6 and 7 is provided with a bracket 23 which is adapted to be secured with the aid of, for example, three screws or bolts (not shown) at the upper side of the longitudinal bearer 24 and cross bearer 25 which form parts of the supporting framework of the vehicle to be referred to herein as vehicle superstructure and which in turn may be constituted by separate supporting frame parts or by a self-supporting type body construction. For that purpose, elongated apertures 26 are provided in the bracket 23 at the corners of a triangle the boundary edges of which are each disposed along an arc about the point 27. This arrangement of the elongated apertures 26 makes it possible to rotate the flange 23, prior to tightening of the non-illustrated securing bolts, about the point 27 within certain limits so that the receiving part 28 of the bearing 22 may be displaced along the arc 29 essentially in the longitudinal direction of the vehicle for fitting the door into the door frame. The receiving part 28 surrounds in this case the vehicle-side end of the support arm 30 into which bolts 31 may again be inserted which in turn extend into appropriate apertures in the receiving part 28 for the rotatable support of the support arm 30.

A particularly advantageous construction of the vehicle-side bearing for the support arms is shown in FIGURES 8 and 9. In this embodiment, the bearings 32 and 33 are arranged at the ends of a cross bearer 34 which may be secured with the aid of flanges 35 to the longitudinal bearers 36 of the motor vehicle. The cross bearer 34 thereby serves simultaneously as base or bed plate for the seat cushions 37 of a seating bench which is also connected with the aid of the flanges 35 with the cross bearer 34. In this manner, there is provided a subassembly including the cross bearer 34 together with the support bearings 32 and 33 and the seat cushions 37 which may be installed as a subassembly during assembly of the motor vehicle. For purposes of securing this subassembly at the longitudinal bearers 36, elongated apertures are provided in the flanges 35 which permit a displacement of the bearing places 32 in the longitudinal direction of the motor vehicle. The securing of the subassembly on the longitudinal bearers 36 by means of bolts, screws or the like can again be undertaken with closed doors without difficulties so that a special fitting of the doors is dispensed with. The very rigid and sturdy construction of the subassembly illustrated in FIGURES 8 and 9 makes it possible to accommodate, for example, at the inner surfaces of the bearings 32 and 33, an anchoring arrangement 39 for the seat belts.

While I have shown and described several embodiments in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A swingable door for a motor vehicle having longitudinal bearer means comprising a support arm having one end thereof pivotably secured within said swingable door, bearing means at the other end of said support arm to enable pivotable movement of said support arm in a horizontal plane parallel to the longitudinal motor vehicle axis, an angularly bent member having an upper portion secured to said bearing means and having an intermediate connecting portion and a lower portion substantially parallel to said upper portion and secured to said bearer means, said upper portion extending into the area occupied by said door in the closed position thereof, said lower portion including a surface supported upon said bearer means, said surface and said bearer means being provided with a plurality of aligned apertures, at least one of each pair of aligned apertures being constructed as an elongated slot so that said surface may be moved upon said bearer means during assembly before rigidly securing said surface to said bearer means.

2. A swingable door having a sealing frame and a panel means covering a portion of the outer side of said sealing frame for motor vehicles having longitudinal bearers comprising a support arm pivotally secured within said door to the inner surface of said panel means, an angularly bent bearing pin having substantially parallel offset end portions and mounted essentially upright in said bearers, and bearing means joining said bearing pin to said support arm at the vehicle side thereof for permitting rotation of said support arm in a horizontal plane parallel to the axis of the motor vehicle, thereby simultaneously permitting both transverse and longitudinal movement of said door with respect to the longitudinal axis of said motor vehicle, said support arm being accommodated within said door in the closed position thereof.

3. A swingable door having a sealing frame and panel means covering a portion of the outer side of said sealing frame for motor vehicles having longitudinal bearers comprising a support arm secured within said door, a flange secured to said longitudinal bearers, an angularly bent bearing pin having substantially parallel offset end portions and mounted essentially upright in said flange, first bearing means connecting said bearing pin to said support arm at the vehicle side thereof for permitting rotation of said support arm with relation to said bearing pin in a horizontal plane parallel to the axis of the motor vehicle, and a second bearing means pivotably securing said support arm to said door at the inner surface of said panel means so that said support arm may be entirely recessed in said door in the closed position thereof and said door can be simultaneously moved both transversely and longitudinally with respect to the longitudinal axis of said motor vehicle into the open position thereof, said support arm being accommodated within said door in the closed position thereof.

4. A swingable door for motor vehicles having longitudinal bearer means, comprising a support arm having one end thereof pivotably secured within the framework of said door, bearing means associated with the other end of said support arm to enable swinging movement of said support arm in a horizontal plane parallel to the longitudinal motor vehicle axis, a journal having substantially parallel offset upper and lower portions with said lower portion positioned within said bearer means and being initially rotatable thereat upon initial mounting of said door in the closed position thereof and with said upper portion connected to said bearing means and means for rigidly fastening said journal and said bearing means to said bearer means, said support arm being accommodated within said door in the closed position thereof.

References Cited by the Examiner

UNITED STATES PATENTS

| 1,045,875 | 12/12 | Nilsen | 16—130 |
| 2,184,532 | 12/39 | Schroeder | 16—131 |
| 2,956,836 | 10/60 | James | 296—47.1 X |
| 3,075,803 | 1/63 | Wilfert | 296—46 |

FOREIGN PATENTS

| 859,117 | 12/52 | Germany. |
| 1,221,318 | 1/60 | France. |
| 1,227,840 | 3/60 | France. |
| 452,679 | 8/36 | Great Britain. |
| 857,844 | 1/61 | Great Britain. |

PHILIP ARNOLD, *Primary Examiner.*

A. HARRY LEVY, *Examiner.*